(12) United States Patent
Gagnon et al.

(10) Patent No.: US 9,176,240 B2
(45) Date of Patent: Nov. 3, 2015

(54) APPARATUS AND METHOD FOR CHANNEL COUNT REDUCTION IN SOLID-STATE-BASED POSITRON EMISSION TOMOGRAPHY

(75) Inventors: Daniel Gagnon, Twinsburg, OH (US); Sachin S. Junnarkar, Mundelein, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 539 days.

(21) Appl. No.: 13/552,155

(22) Filed: Jul. 18, 2012

(65) Prior Publication Data

US 2014/0021354 A1    Jan. 23, 2014

(51) Int. Cl.
*G01T 1/208* (2006.01)
*G01T 1/164* (2006.01)

(52) U.S. Cl.
CPC .............. *G01T 1/208* (2013.01); *G01T 1/1647* (2013.01)

(58) Field of Classification Search
CPC ...................................................... G01T 1/208
See application file for complete search history.

(56) References Cited

U.S. PATENT DOCUMENTS

| | | | |
|---|---|---|---|
| 3,594,577 A * | 7/1971 | Loveday | 250/366 |
| 2004/0031926 A1 | 2/2004 | Ogawa et al. | |
| 2009/0020704 A1* | 1/2009 | Wellnitz | 250/369 |

FOREIGN PATENT DOCUMENTS

| | | |
|---|---|---|
| JP | 2002-116256 A | 4/2002 |
| WO | WO 2012005767 A2 * | 1/2012 |

OTHER PUBLICATIONS

International Search Report issued in Patent Application No. PCT/JP2013/069564 (with English language translation), Oct. 8, 2013 (1 page)

* cited by examiner

*Primary Examiner* — David Porta
*Assistant Examiner* — Shun Lee
(74) *Attorney, Agent, or Firm* — Oblon, McClelland, Maier & Neustadt, L.L.P.

(57) ABSTRACT

An apparatus and method for channel count reduction in solid-state-based positron emission tomography that multiplexes read-outs from photo-detectors using a sum delay circuit, including a sum channel and a delay-sum channel. The sum channel sums signals from sensors in an array and is digitized to extract the timing and energy information. A delay-sum channel includes a discrete delay line that introduces a known delay after each sensor, creating a time signature for the sensor, followed by a summing circuit that adds the delayed signals. The delay-sum channel is digitized using a high speed counters to extract location information. Start and Stop signals for the counter are derived when the sum channel output and the delay-sum channel output cross a pulse ID threshold, respectively. The pulse ID threshold is chosen to minimize the Compton scatter and not clip the photo-peak events.

22 Claims, 11 Drawing Sheets

APPARATUS AND METHOD FOR CHANNEL COUNT REDUCTION IN SOLID-STATE-BASED POSITRON EMISSION TOMOGRAPHY

FIELD

The present disclosure generally relates to an apparatus and method for channel count reduction in positron emission tomography (PET). More specifically, the present disclosure relates to an apparatus and method for channel count reduction in solid-state-based positron emission tomography, by multiplexing read-outs from photo-detectors.

BACKGROUND

PET imaging starts with the administration (mostly injection but also inhalation and ingestion) of a radiopharmaceutical to a patient, and in time, the physical and bio-molecular properties of the agent will concentrate at specific locations in the human body. The actual spatial distribution, the intensity of the point or region of accumulation, and the kinetics of the process from administration to capture to eventually elimination, are all elements that may have a clinical significance. During this process, the positron emitter attached to the pharmaceutical agent will emit positrons according to the physical properties of the isotope (half-life, branching ratio). Each positron will eventually interact with an electron of the object to get annihilated, and produce, most of the time, two gamma rays at 511 keV at substantially 180 degrees from each other. Those two gamma rays can be detected preferably using a scintillating crystal followed by a photo-detector and processing electronics.

Drawing a line between the detected locations of a pair of gamma rays, also called as a line-of-response (LoR), one can retrieve the likely location of the original annihilation event. While this process will only identify a line along which the annihilation event has occurred, by accumulating a large number of these lines, and through the tomographic reconstruction process, the original distribution of positron emitters can be estimated.

In addition to the location of the two scintillation events, if accurate timing (within a few hundred picoseconds) is available, the time it takes for the gamma ray to traverse from its point of origin to the detector electronics can be precisely calculated. This time, called time-of-flight (ToF), adds more information on the likely position of its origin, viz. the annihilation location, along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (energy of the positron) will also contribute, via positron range and co-linearity of the two gamma rays, to the determination of the spatial resolution for a specific agent.

The above calculations need to be repeated for a large number of events. While every case needs to be analyzed to determine how many counts (paired events) are required to support the imaging tasks, current practice dictates that a typical 100 cm long, FDG (fluoro-deoxyglucose) study should accumulate hundreds of millions of counts. The time it will take to accumulate this number of counts is determined by the injected dose and the sensitivity and counting capacity of the scanner.

The counting capacity of the scanner is determined mainly by two factors. First, the decay time of the scintillating crystal determines the time for which the sensor will be occupied. This is an irreducible parameter and is inherent to the very nature of the crystal. The time it takes for the scintillation light to be created and integrated will determine the minimum amount of time for event processing. If another event were to occur during this period of time, the light from the second event would bias the estimation of the event, to the point of rendering the estimation of timing, energy, and position invalid, and both events might even need to be discarded.

The second variable influencing the count rate is the fraction of the total surface of the scanner "affected" or "occupied" during an event, also called a trigger zone. A second event can occur at any time during the processing of a first event if it occurs outside the trigger zone in a different location, and uses a different set of electronics channels. Consequently, the notion of trigger zones and integration time is critical in determining the counting rate capacity of a scanner.

Therefore, a desire exists to create a very small trigger zone to maximize count rate. However, this is immediately opposed by the fact that a smaller detector area will also increase the electronics channel count and, in turn, the overall system cost.

Conventional approaches typically implement multiplexing of channels when the channel count becomes too high to implement the signal processing electronics using discrete components. For example, a typical modern PET scanner will utilize only a few hundred sensors for the entire scanner, and one-to-one coupling of sensors to the processing electronics channel is clearly affordable in this case.

The use of other types of sensors, for example, multi-anode photo-multiplier tubes (PMT), photodiodes, avalanche photodiodes (APD), or more recently, solid-state photo-multipliers (SiPM, SSPM, MPPC etc) will usually result in several thousands or even tens of thousands of sensors. In this case, efforts to optimize the channel count are clearly required. Two such channel count reduction techniques are to use summing circuits by quadrant (Anger logic), or by rows and columns, as shown in FIGS. 1 and 2, respectively.

FIG. 1 shows a variation of Anger logic by quadrant, wherein a block of Bismuth Germanium Oxide (BGO) crystals is read out by 4 quadrants 101 created by summing 2×2 matrices of SiPM 103. Anger logic is applied to the outputs of these quadrants to estimate the position, energy, and timing.

FIG. 2 shows a conventional row-column read-out using row-wise and column-wise summing (Σ) channels. In this example case of a 4×4 matrix of 16 sensors 201 (or sensor cells), 4 rows and 4 columns can properly identify the location of the event in the array. This approach uses only 8 electronics channels compared to dedicated electronics channel for each sensor, where the channel count is 16. The larger the array, the more channel count reduction is achieved by this approach, e.g., in the case of square arrays where N is the number of sensors in every row and column, the difference between N×N and 2N becomes significant.

One problem with this approach is that the signal is divided into multiple summing circuits in the case of gamma interactions from multiple crystals (via Compton scattering in the first crystal). This situation is quite common. In a typical PET scanner construction with 20 mm thick LYSO and 4×4 mm² crystals, only 78% of all interactions affect a single crystal, and the remaining 22% of the events produce light in at least two neighboring crystals. This proportion varies with the actual design of the crystal sizes and thicknesses, but remains a significant problem that needs to be addressed.

Most of these multiple-interaction events will affect the very first row of crystals around the crystal of interest, creating a possible matrix of nine crystals including the crystal of interest, centered at the crystal of interest. If partial energy deposition occurs at the left or right of the central crystal, the horizontal line should capture the sum of the two sensors affected. If it is at the top or bottom of the central crystal, the vertical line should do the same. However, any oblique interaction will distribute the signal over multiple summing lines.

The overall effect of this approach is that the system will need to analyze both horizontal and vertical lines on summed signals to find out which one contains the best signal for timing pick-off. Moreover, in the case of oblique interactions, the best signal will be degraded, thereby limiting the ability of a good timing estimation.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
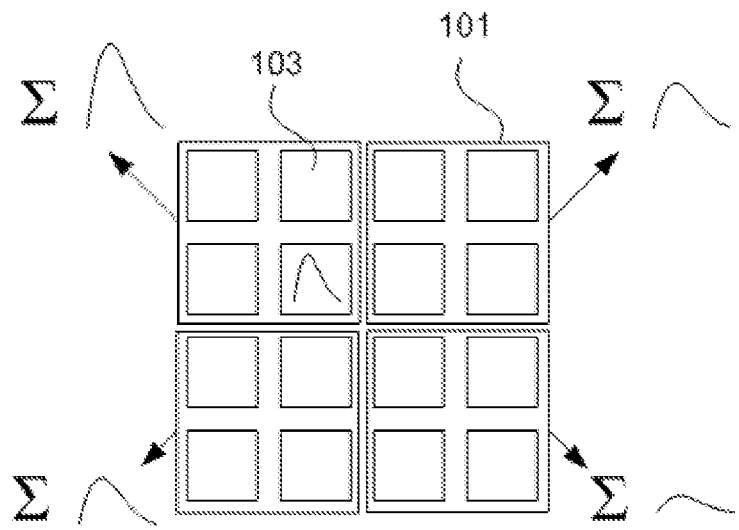
FIG. 1 shows a variation of Anger logic by quadrant, where a block of BGO is read out by 4 quadrants created by summing 2×2 SiPM matrices.
Figure 2:
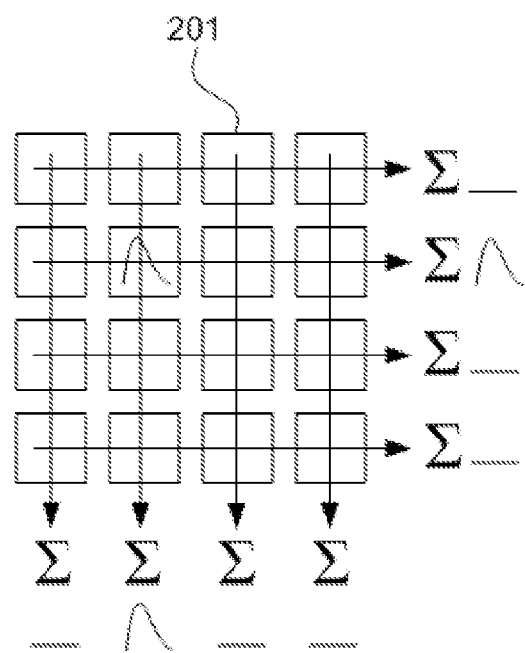
FIG. 2 shows a conventional row-column read-out using row-wise and column-wise summing ($\Sigma$) channels.

The present disclosure describes a method to reduce the channel count while allowing the use of a smaller trigger zone and affording a very high count rate capacity and greater positioning accuracy. Disclosed embodiments offer a greater channel count reduction, while also providing a more optimal system design, with one part of the circuitry dedicated to timing and energy estimation, and another part to positioning into the array.

According to a first embodiment, there is provided a data acquisition device for a gamma ray detector, comprising a summing circuit configured to sum a plurality of electrical signals from a corresponding plurality of sensors coupled to an array of scintillation crystals to generate a first signal, the plurality of sensors converting received light into the plurality of electrical signals, wherein the light is generated by a crystal of interaction in response to incident gamma rays generated by an annihilation event, a delay summing circuit configured to selectively delay and sum the plurality of electrical signals to generate a second signal, a first circuit configured to receive the first signal and to determine an energy and an event time of the first signal, and a second circuit configured to receive the first signal and the second signal and to determine, when the first signal exceeds a predetermined threshold, which sensor of the plurality of sensors corresponds to a location of the crystal of interaction.

According to a second embodiment, there is provided a gamma ray detector, comprising an array of scintillation crystals, an array of sensors, and a plurality of data acquisition devices, each data acquisition device including a summing circuit configured to sum a plurality of electrical signals from a corresponding plurality of sensors coupled to the array of scintillation crystals to generate a first signal, the plurality of sensors converting received light into the plurality of electrical signals, wherein the light is generated by a crystal of interaction in response to incident gamma rays generated by an annihilation event, a delay summing circuit configured to selectively delay and sum the plurality of electrical signals to generate a second signal, a first circuit configured to receive the first signal and to determine an energy and an event time of the first signal, and a second circuit configured to receive the first signal and the second signal and to determine, when the first signal exceeds a predetermined threshold, which sensor of the plurality of sensors corresponds to a location of the crystal of interaction.

According to a third embodiment, there is provided a gamma ray detection method, comprising generating a first signal by summing a plurality of electrical signals from a corresponding plurality of sensors coupled to an array of scintillation crystals, the plurality of sensors converting received light into the plurality of electrical signals, wherein the light is generated by a crystal of interaction in response to incident gamma rays generated by an annihilation event, generating a second signal by selectively delaying and summing the plurality of electrical signals, determining an energy and an event time of the first signal, and determining, based on the second signal, which sensor of the plurality of sensors corresponds to a location of the crystal of interaction, when the first signal exceeds a predetermined threshold.

Figure 3:
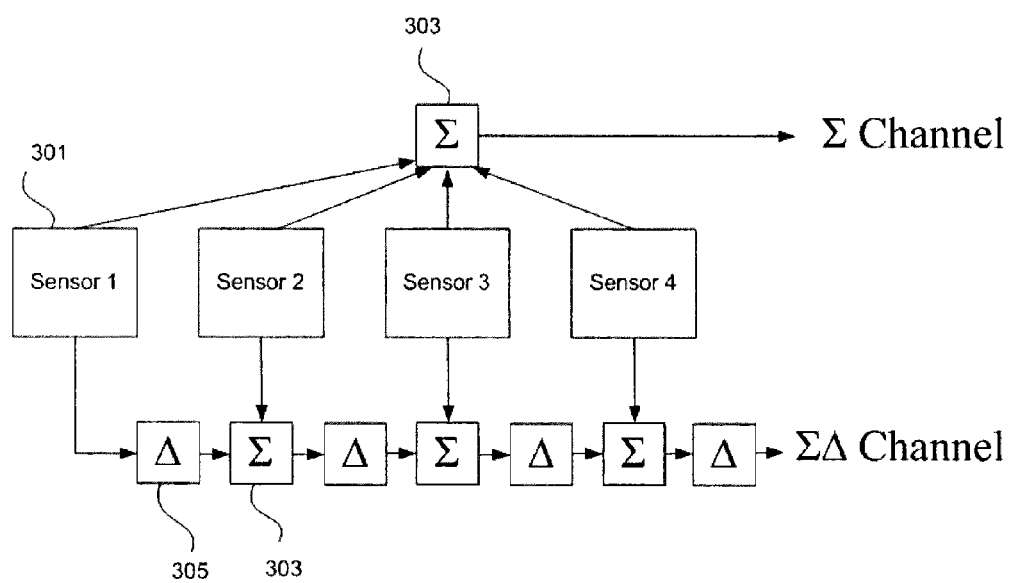
FIG. 3 shows a schematic diagram of $\Sigma$ and $\Sigma\Delta$ channel multiplexing for an array of 4 sensors.

Referring now to the drawings, wherein like reference numerals designate identical or corresponding parts throughout the several views, FIG. 3 shows one embodiment using an array of sensors 301. The four sensors shown represent a row, column, or area of the array. In this example, four sensors are shown, but any number of sensors can be used. A concept of the $\Sigma\Delta$ approach is to create two channels in the following fashion. The first channel is called the $\Sigma$ channel, which is the output of a summation circuit 303 that sums signals from all the sensors 301 along a row (or a column), and therefore creates an optimal signal for energy estimation and timing pickoff. The second channel is called the $\Sigma\Delta$ channel, which is created by inserting a known delay element $\Delta$ 305 for each sensor 301, thus creating a time signature for the location of the event, and then summing the delayed signals using a summation circuit 303.

Figure 4A:
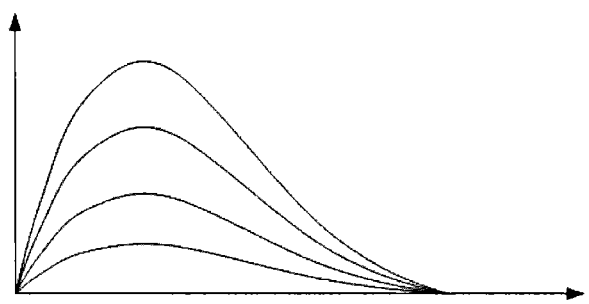
FIGS. 4A and 4B show the sensor outputs for an array of 4 sensors before and after being selectively delayed, respectively.
Figure 4B:
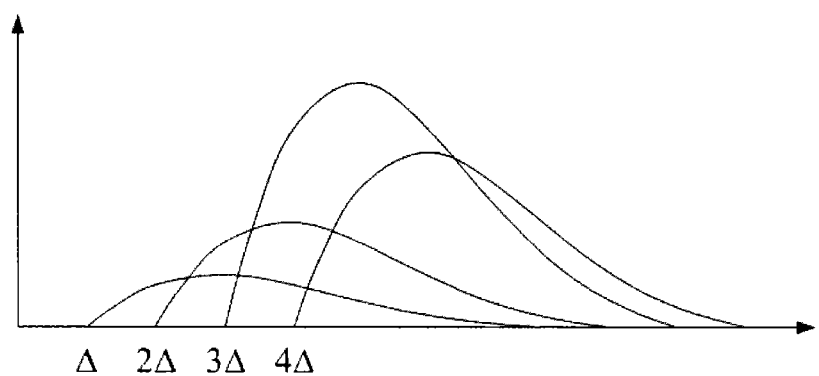

FIGS. 4A and 4B show an example of four sensor signals before and after being delayed, respectively. In this example, the different delay times introduced to different sensor signals are integer multiples of a predetermined delay time $\Delta$.

Figure 5:
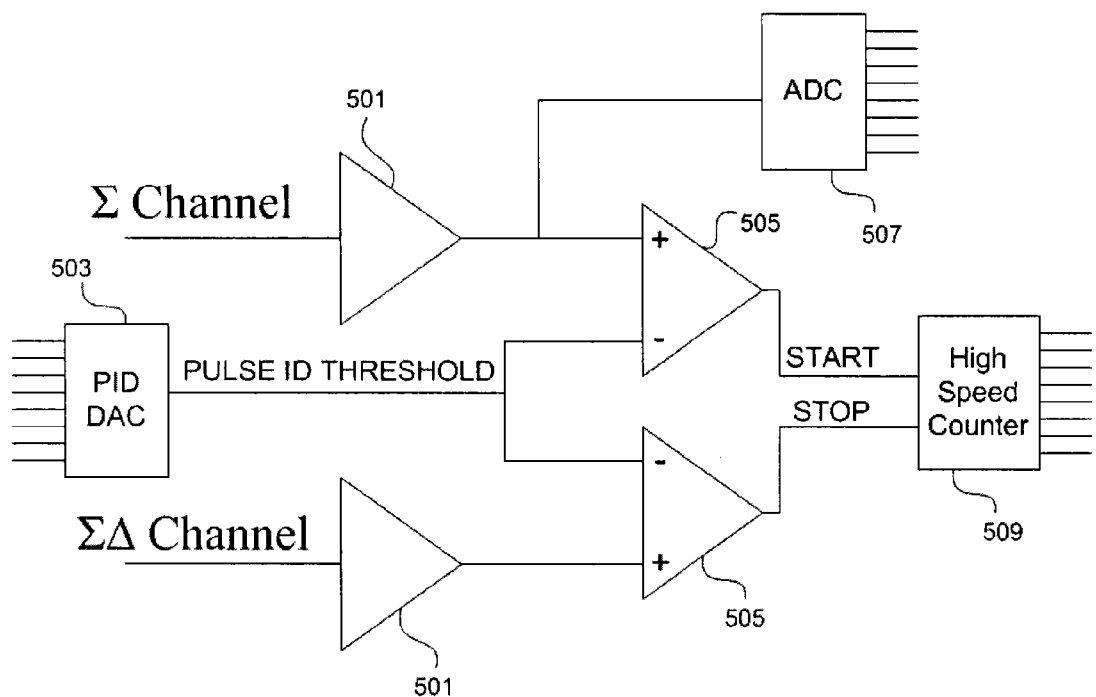
FIG. 5 shows a block diagram of $\Sigma$ and $\Sigma\Delta$ channels.

FIG. 5 shows a block diagram of the $\Sigma$ and $\Sigma\Delta$ channels. Each of the $\Sigma$ and $\Sigma\Delta$ channels are conditioned by a corresponding pre-amplifier and shaper 501, the output of which is connected to the positive input of a corresponding comparator 505. The negative input of the comparators 505 is connected to the output of a pulse ID threshold DAC 503. The outputs of the comparators 505 corresponding to the Σ and ΣΔ channels provide a "start" and a "stop" signal, respectively, to a high speed counter 509.

The output signal of the pre-amplifier and shaper 501 corresponding to the Σ channel is further connected to an ADC circuit 507, which digitizes the signal and extracts timing and energy.

The ΣΔ channel is digitized by the high speed counter 509 to extract location information. (By comparison, for row-column logic, 16 channels will be digitized directly using analog-to-digital converters (ADCs), and the comparators and DACs are not required. This requires twice the number of ADCs, and in turn twice the power dissipation).

The START signal is generated when the Σ channel output crosses a pulse ID threshold. In the ΣΔ channel, the signals from the SiPMs will propagate through a number of discrete delay elements with a precise time delay of Δ, and a summing Σ circuit. The pulse identification threshold in this channel provides a STOP signal. The time difference between the derived START and STOP signals provides location information on the detector line. The total delay introduced due to the delay line is less than 80 ns total for a delay chain containing 8 SiPMs. Compared to the row-column and quad multiplexing approaches, the electronic dead time per channel is greater, but due to smaller detector occupancy, its overall effect is minimal.

Figure 6:
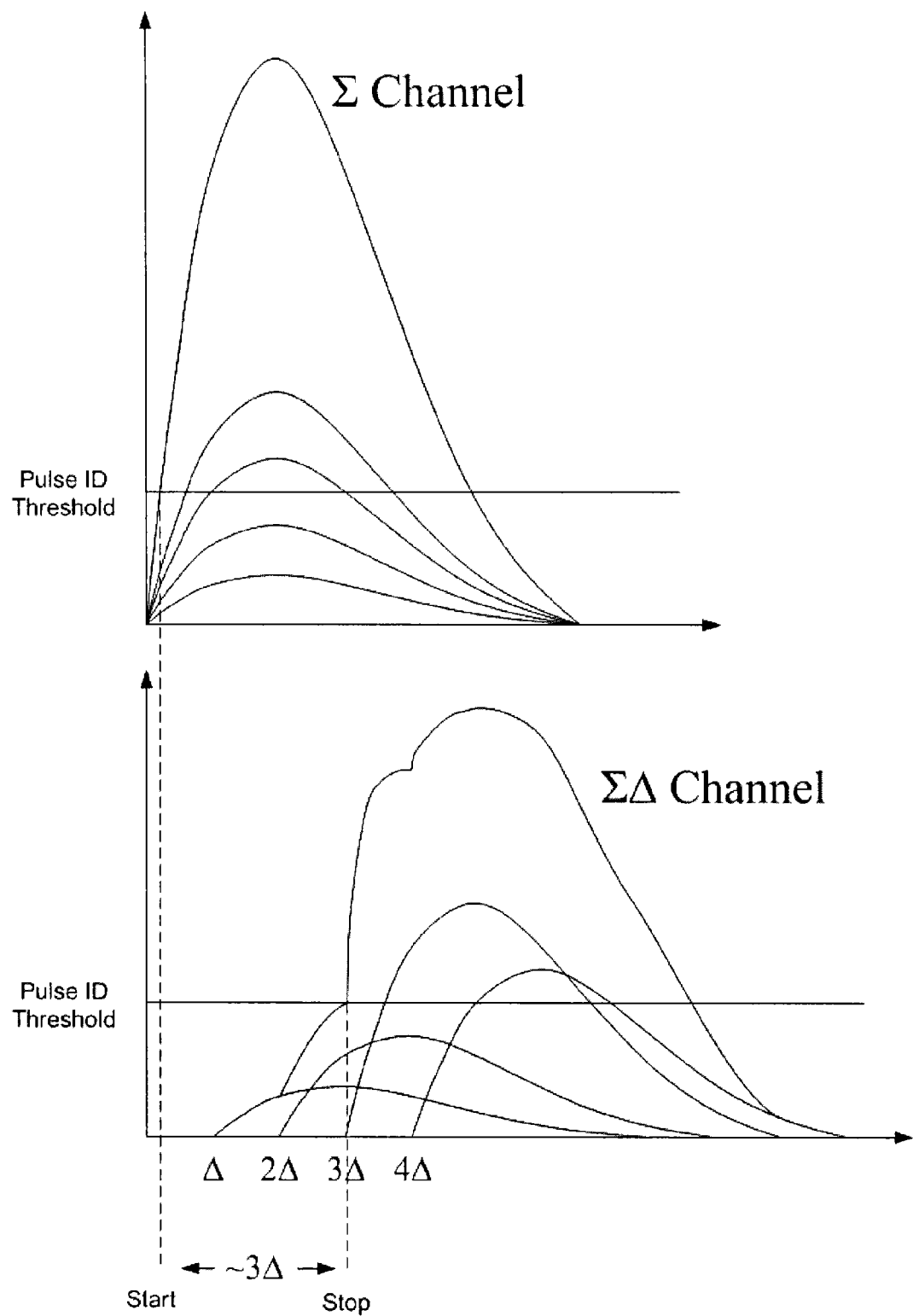
FIG. 6 shows the timing diagrams of the $\Sigma$ and $\Sigma\Delta$ channels.

FIG. 6 shows the timing diagrams of the Σ channel, the ΣΔ channel, and the comparator outputs. In this example, the Σ channel and the ΣΔ channel provide the sum and the delay-sum of the output signals from 4 detectors, respectively. In this example, the output signals from 4 detectors are delayed by different delay amounts, i.e., Δ, 2Δ, 3Δ, and 4Δ. A pre-calibrated Pulse ID threshold is applied to both the Σ channel and the ΣΔ channel, to extract a START signal and a STOP signal, respectively. The Pulse ID threshold is chosen such that the STOP signal corresponds to the delay time of the strongest signal among the 4 detectors. In this example, the strongest signal is delayed by 3Δ, and thus the time difference between the START and STOP signals is approximately 3Δ.

The pulse ID (PID) threshold for the ΣΔ channel needs to be chosen carefully to minimize the Compton scatter and not clip the photo-peak events. Based on the energy resolution observed during measurements, the Compton valley lies around $3\sigma_{ER}$ lower than the photo-peak, where $2.34*\sigma_{ER}$ is the energy resolution (18%~25% measured). Since energy measurement is crude and does not use integrated values from the complete scintillator pulse, placing the PID threshold at this value is prone to slightly larger Compton acceptance. In addition the noise present at the PID comparator puts a constraint on the threshold. A careful comparator design is used to minimize Compton acceptance. In order that the comparator won't trigger due to photon-statistical noise, the comparator is designed using negative hysteresis that is equal to at least $2\sigma_{PID}$, where $\sigma_{PID}$ is the noise at the PID comparator input. The energy measurement error $\sigma_{PID}$ is given by equation (1):

$$\sigma_{PID} = \sqrt{\sigma_{photon}^2(t_{PID}) + \sigma_{ENC}^2} \quad (1)$$

$$\sigma_{photon}^2 = qFM^2 \int_{-\infty}^{\infty} I_{photon}(\alpha)\varpi^2(t-\alpha)d\alpha \quad (2)$$

where $\sigma_{photon}$ is the photon-statistical noise, $t_{PID}$ is the time when the PID threshold is crossed and $\sigma_{ENC}$ is the electronic noise. In equation (2), q is the charge, F is an excess noise factor, M is the gain of the photo-detector, and ω is the weighting function of the preamplifier and shaper. $I_{photon}$ is the intensity function for BGO and can be approximated to a double (or triple with 60 ns~10% and 300 ns~90%) decay exponential.

The purpose of the pulse identification circuit is to locate the crystal of highest energy interaction point. Timing is extracted by applying a timing threshold to the timing comparator, which provides the START signal. To find the highest energy interaction point, the ΣΔ pulse is applied to one input of a comparator, and the second input of the comparator is set using a DAC to a pulse ID threshold value. The comparator fires giving a STOP signal when the pulse identification threshold is crossed by the ΣΔ pulse. An optimum pulse ID threshold needs to be placed at $(3\sigma_{ER}+3\sigma_{PID})$ below the photo-peak (where $\sigma_{ER}$ is the standard deviation of the photo-peak distribution) to minimize or reject Compton scatter and accept only the photo-peak events.

Assuming a yield of 10600 photons/MeV for BGO, and 25% energy resolution, the PID threshold will be placed at or about 3680 photons. Assuming that we use a peaking time of 900 ns (a tradeoff between dead time and energy resolution will drive this number), the PID threshold will be crossed at about 600 ns. The photon noise contribution is approximately ~60 photons at the PID comparator threshold. This would correspond to 1% of photo-peak events. Optimum SNR is obtained using an integration capacitor equal to that of the detector, the SPM35CN device capacitance (Cdet). Using these values to calculate the slope of the signal at the PID threshold crossing, and using a PDE of 10% and a gain of $3.2\times10^6$, the photon statistics noise is σphoton=50 mV RMS for $\sigma_{ENC}$=3.5 mV.

The value of Δ is at least $3\sigma_{ENC}$ greater than the electronic noise $\sigma_{ENC}$. Larger values of Δ are not advised because this would increase the photon-statistical noise contribution, which would otherwise cancel out, given that ΣΔ is a delayed sum version of the signal in the Σ channel. If the photon-statistical noise contribution to the START signal from a given detector element n at PID threshold crossing of Σ is $\sigma_{PID}n$, then the photon-statistical noise contribution to the STOP signal from the delayed signal from n is simply $\sigma_{PID}n+\delta n$. The overall noise contribution to START-STOP is then δn, which varies with Δ. Thus, δn will increase with a larger value of Δ, and the larger the Δ, the larger the noise contribution, since as Δ→0, photon statistic noise in (STOP-START)→0. The position information is given by the difference between the STOP and START, and the error in the position information is only limited by the non-coherent electronic noise, and not the photon statistics. Also, smaller values of Δ are advised with a theoretical lower limit given by electronic noise, $\sigma_{ENC}$.

With an appropriate choice of Δ, careful comparator design, and calibration of PID thresholds, this approach is limited only by the energy resolution, the accuracy of the pulse identification circuit, and the high-speed counter frequency. The overall number of delays that the system can include, and thereby the size of the array that can be multiplexed, is roughly dependent on the processing time for one event, as the energy, timing, and position information will eventually need to come together to define an event. Encoding of fast crystals such as LYSO, with ~40 ns decay time may be limited to 4×10 ns individual delays, assuming 10 ns as a reasonable delay quantum, and the same delay chain on a slower crystal like BGO, with 300 ns decay, would allow more than 30 sensors to be encoded. For an 8×8 matrix, this would entail an additional 80 ns of dead time on top of the chosen integration time, compared to the row-column logic concept, which is a small price to pay for a smaller trigger zone area and the channel count reduction that this embodiment offers.

The BGO timing resolution is poorer than the LYSO. The first photo-electron timing errors for two different energy discrimination thresholds are shown in FIG. 6. The source of this timing error is the non-homogeneous Poissonian nature of the photon arrivals at the face of the photo-detector. For BGO, due to lower number of generated photons stretched on a larger time scale of 300 ns (90%), such a fluctuation is observed.

The RMS error in the timing measurement is dependent on the threshold as well as the photon collection. From the literature, the error lies between 2 ns to 7 ns for a given threshold. This would dictate the coincidence timing window $2\tau$ using the BGO scintillator, and would be about 2.8 ns~9.8 ns.

Figure 7:
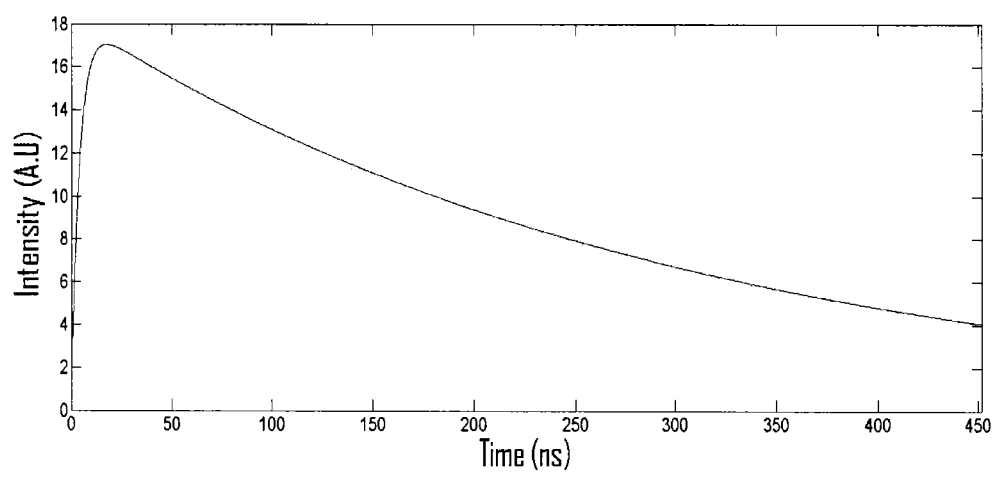
FIG. 7 shows the intensity function for a BGO scintillator used to determine photon arrival times.

FIG. 7 shows the intensity function for a BGO scintillator used to determine photon arrival times. Matlab simulation of a non-homogenous Poissionian process with a double-decay exponential model of BGO scintillator response was used to obtain this function.

Figure 8A:
FIGS. 8A and 8B show arrival times, which represent illustration of typical paths taken by a non-homogenous Poisson process, and typical current pulse out of the BGO-PMT setup using a superposition model, respectively.
Figure 8B:
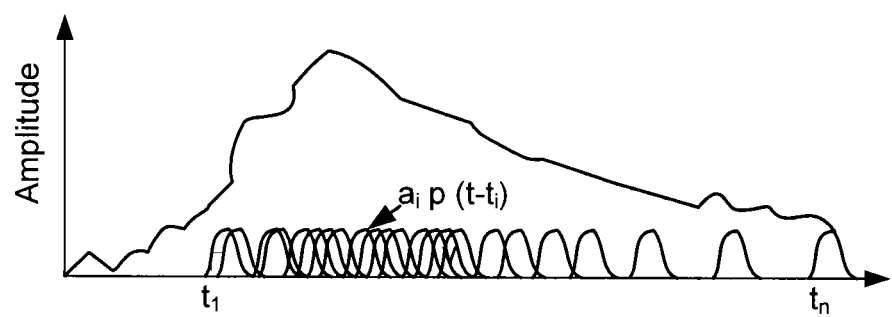

FIGS. 8A and 8B show the arrival times that represent an illustration of a typical path taken by a non-homogenous Poisson process, and a typical current pulse out of the BGO-SiPM setup using a superposition model, respectively. The BGO decay model is convolved with the SiPM single electron response and a randomly picked gain value from the independent identically distributed PDF. The pulses seen near the floor are an illustration of a single photon response.

Figure 9:
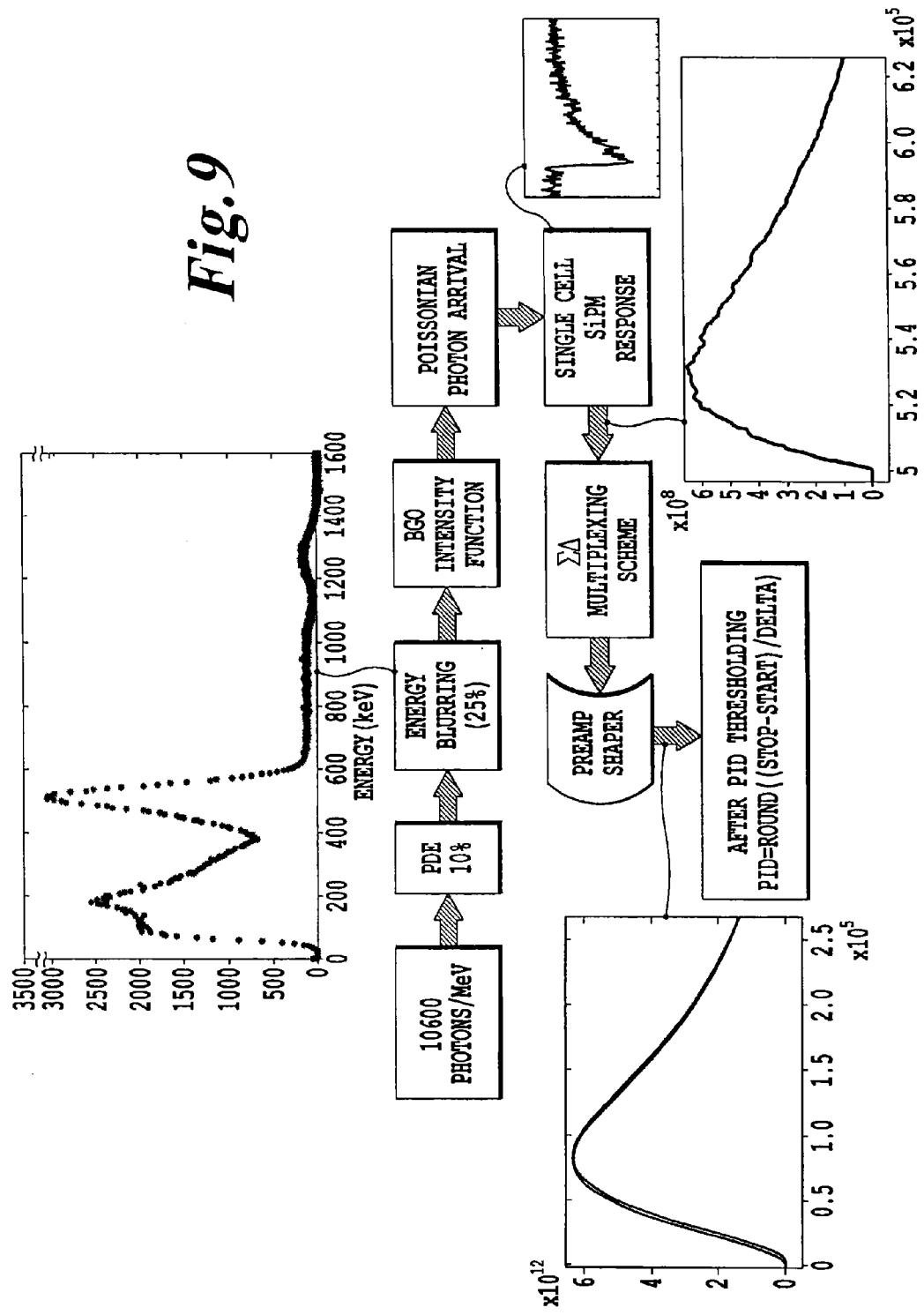
FIG. 9 is a flowchart of a simulation setup used to study the $\Sigma\Delta$ scheme.
Figure 10A:
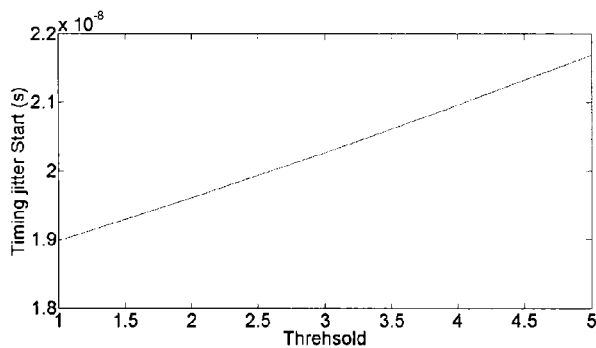
FIGS. 10A-10D show the results of a $\Sigma\Delta$ Monte Carlo simulation.
Figure 10B:
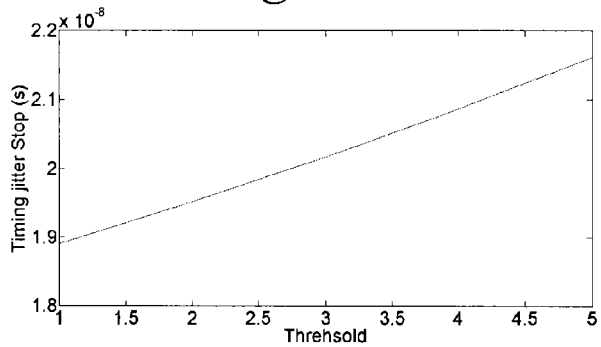
Figure 10C:
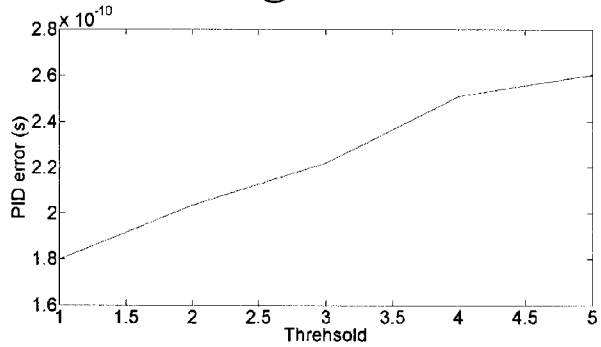
Figure 10D:
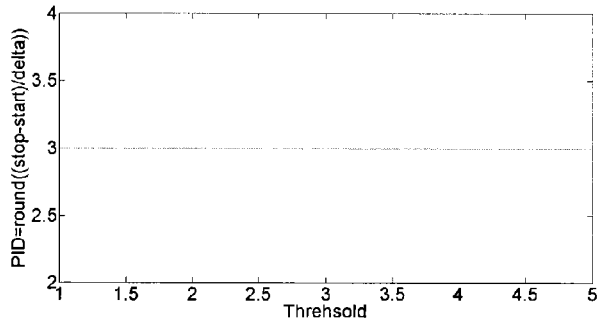

A similar simulation study for the BGO scanner with an average SiPM response was conducted. The flowchart in FIG. 9 summarizes the setup used for the study. Starting with a mean 10600 photons/MeV, the signal chain is simulated to reflect the photon detection efficiency, energy blurring, the BGO response intensity function shown in FIG. 8, and non-homogeneous Poissonian arrival times of the photons. These are then convolved with the single SiPM cell response, which approximates the SiPM output. Monte Carlo simulation is performed to simulate 100 gammas. Randomly selected photo-peak and lower energy events are used as input to the $\Sigma\Delta$ operator. The outputs of the $\Sigma$ and $\Sigma\Delta$ channels are then convolved with the second order preamp shaper impulse response. As described earlier, pulse ID threshold is placed such that Compton scatter is rejected. The pulse is identified when the preamp-shaper output crosses the PID threshold. The START time is obtained when the $\Sigma$ channel crosses the PID threshold. Similarly, the time instance when $\Sigma\Delta$ channel crosses the same PID threshold is labeled as the STOP time. The PID is then given by equation (3).

$$PID = \left\| \frac{Stop\text{-}Start}{\Delta} \right\| \quad (3)$$

Monte Carlo simulations for 25 different combinations of photo-peak and scatter were performed with 5 different threshold values. FIGS. 10A-10D show the results of these $\Sigma\Delta$ Monte Carlo simulations. In each case, the photo-peak pulse was in location 3 with two Compton neighbors. The PID formula was able to identify the pulse every single time without an error. The standard deviation in the START and STOP signals was in the range of 19 ns to 22 ns, as expected. Also, as anticipated from the theory described above, the standard deviation in the START-STOP ranged from 180 ps to 260 ps.

The value of $\Delta=10$ ns was able to successfully decode the PID location, as seen in FIGS. 10A-10D.

Embodiments disclosed herein offer a factor of 4 reduction in the number of electronics channels. The embodiments also afford a very small trigger zone compared to conventional approaches. The count rate performance for a scanner with such a readout scheme would be superior to the conventional approaches, and channel count reduction will be equivalent to the Anger logic method. Inter-crystal scatter causes mispositioning of scintillation events. The ability and limits of $\Sigma\Delta$ to handle multi-crystal events are better than the conventional approaches. Just by its design, $\Sigma\Delta$ adapts the highest energy positioning method to locate multi-crystal events. Compared to the Anger logic method, which uses a weighted-energy positioning method, the $\Sigma\Delta$ method offers 10% or better positioning accuracy. This is done by plainly rejecting low-energy scatters by employing the calibration method to identify the scatter threshold.

Embodiments disclosed herein utilize discrete commercial off-the-shelf components. Alternative embodiments of this scheme will implement an Application Specific Integrated Circuit (ASIC) in a standard complementary metal-oxide semiconductor (CMOS) technology, affording much smaller real estate and low power consumption.

Embodiments disclosed herein will provide a maximum channel count reduction at a very high count rate performance, therefore a better cost structure, while maintaining a high fidelity of the sensor responses. In some cases, it is believed that a 2-channel system by daisy chaining the rows in order to create $\Sigma$ and $\Sigma\Delta$ channels may harness a 16-cell sensor matrix, while the conventional row-column system would require 8 channels.

Figure 11:
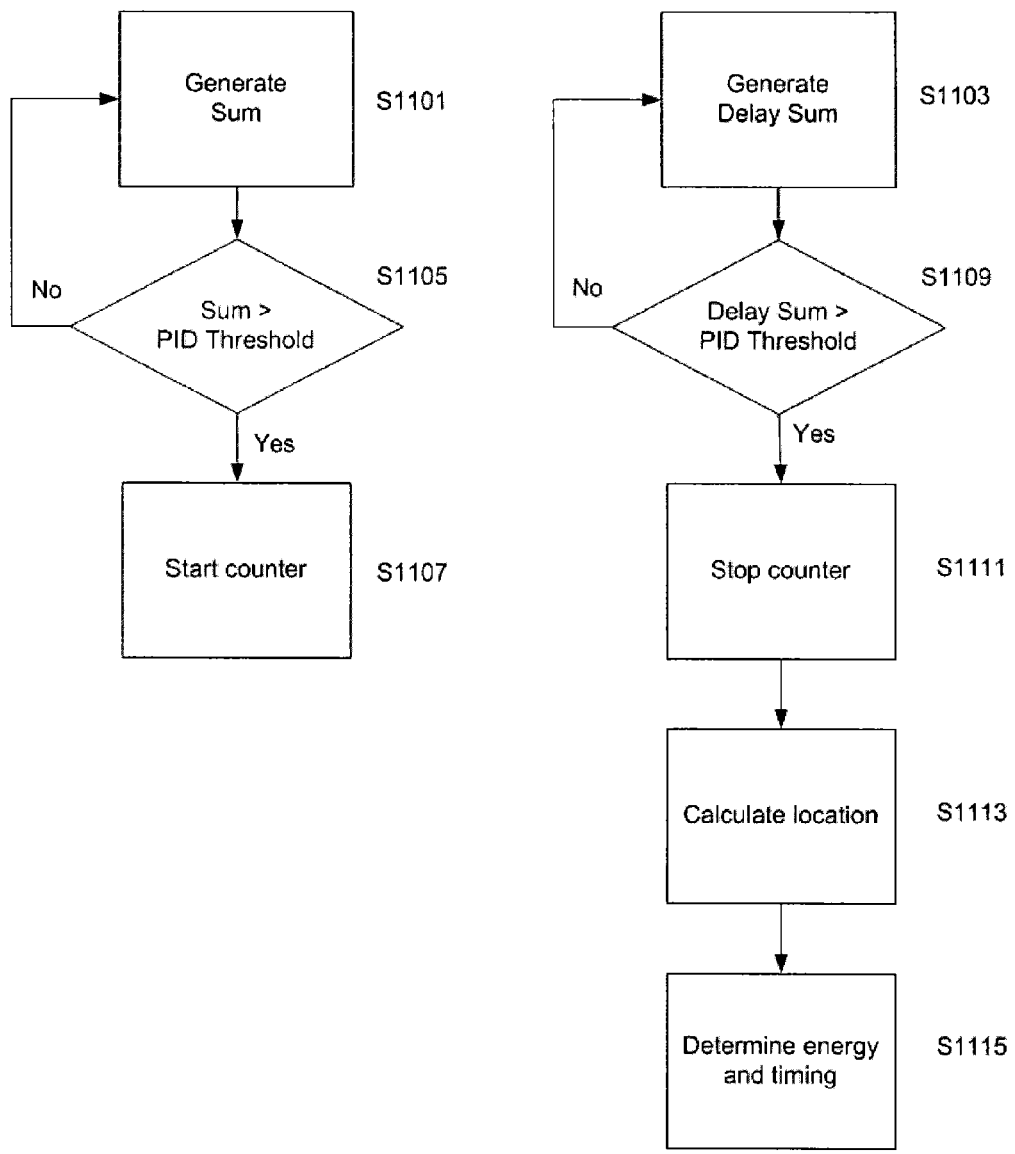
FIG. 11 shows a flowchart for a method of data acquisition in a gamma ray detector.

FIG. 11 shows a flowchart for a method of data acquisition in a gamma ray detector. The flowchart includes one process including steps S1101, S1105, and S1107, and another process including steps S1103, S1109, S1111, S1113, and S1115.

In step S1101, a sum signal of the electrical signals from sensors coupled to an array of scintillation crystals is generated.

In step S1103, a delay sum signal of these electrical signals is generated such that each signal is delayed by a different amount of time.

In step S1105 the sum signal is compared with a pulse ID threshold, and if the sum signal is larger than the pulse ID threshold, a counter is started in step S1107. Otherwise, the process goes back to step S1101.

In step S1109 the delay sum signal is compared with the pulse ID threshold, and if the delay sum signal is larger than the pulse ID threshold, the counter is stopped in step S1111. Otherwise, the process goes back to step S1103.

In step S1113 the location of an event is calculated.

In step S1115 the timing and energy of the event is determined.

Figure 12:
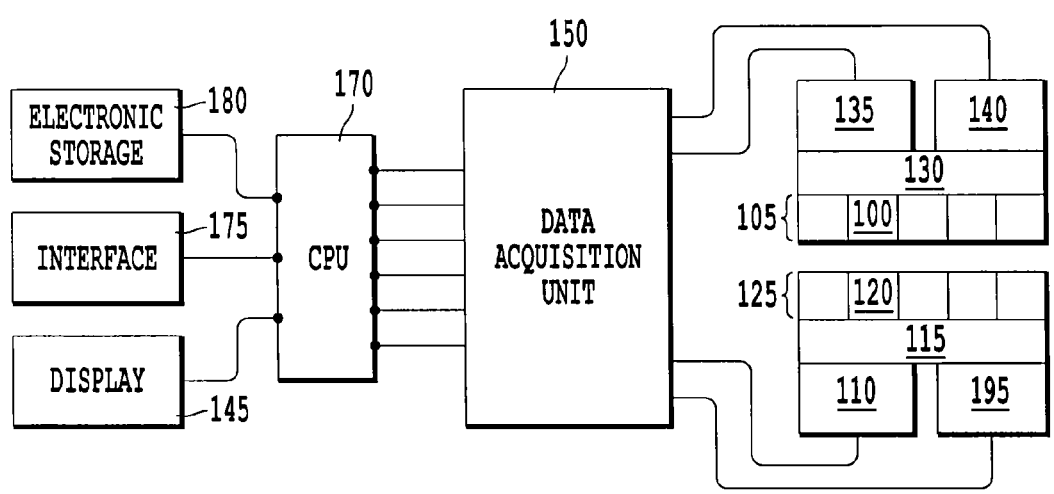
FIG. 12 shows a block diagram of a gamma ray detector.

FIG. 12 shows an exemplary hardware configuration that can be used with the present technological advancement to detect gamma rays. In FIG. 12, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes 195 and 110 arranged thereover.

In FIG. 12, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube 110, 135, 140 and 195 is respectively connected to data acquisition unit 150. The data acquisition unit 150 includes hardware configured to process the signals from the photomultiplier tubes. The data acquisition unit 150 measures the arrival time of the gamma ray. The data acquisition unit 150 produces two outputs (one for the combination of PMT 135/140 and one for the combination of PMT 110/195) which encodes the time of the discriminator pulse relative to a system clock (not shown). For a time of flight PET system, the data acquisition unit 150 typically produces a time stamp with an accuracy of 15 to 25 ps. The data acquisition unit measures the amplitude of the signal on each PMT (four of the outputs from data acquisition unit 150).

The data acquisition unit outputs are provided to a CPU, 170, for processing. The processing consists of estimating an energy and position from the data acquisition unit outputs and an arrival time from the time stamps output for each event, and may include the application of many correction steps, based on prior calibrations, to improve the accuracy of the energy, position, and time estimates. As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory.

Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may be implemented as a set of computer-readable instructions stored in any of the above-described electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an OPTERON processor from AMD of America and an operating system, such as MICROSOFT VISTA, UNIX, SOLARIS, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 12 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A data acquisition device for a gamma ray detector, comprising:
   a summing circuit configured to sum a plurality of electrical signals from a corresponding plurality of sensors coupled to an array of scintillation crystals to generate a first signal, the plurality of sensors converting received light into the plurality of electrical signals, wherein the light is generated by a crystal of interaction in response to incident gamma rays generated by an annihilation event;
   a delay summing circuit configured to selectively delay and sum the plurality of electrical signals to generate a second signal;
   a first circuit configured to receive the first signal and to determine an energy and an event time of the first signal; and
   a second circuit configured to receive the first signal and the second signal and to determine, based on when the first and second signals respectively exceed a predetermined threshold, which sensor of the plurality of sensors corresponds to a location of the crystal of interaction.

2. The data acquisition device of claim 1, wherein the delay summing circuit comprises:
   at least one summer and at least one delay element so that the second signal is a sum of each signal of the plurality of electrical signals delayed by a different amount of time.

3. The data acquisition device of claim 1, wherein the plurality of sensors form a row, a column, or a block of sensors within a larger array of sensors.

4. The data acquisition device of claim 1, wherein the second circuit comprises:
   a pulse ID threshold generator configured to generate the predetermined threshold;

a first comparator configured to compare the first signal with the predetermined threshold, and to generate a start signal when the first signal exceeds the predetermined threshold;

a second comparator configured to compare the second signal with the predetermined threshold, and to generate a stop signal when the second signal exceeds the predetermined threshold; and a counter configured to receive the start and stop signals, to start counting in response to receiving the start signal, and to stop counting in response to receiving the stop signal.

5. The data acquisition device of claim 4, wherein the pulse ID threshold generator includes a digital-to-analog converter.

6. The data acquisition device of claim 1, further comprising:
   a first pre-amplifier/shaper circuit configured to pre-amplify and shape the first signal; and
   a second pre-amplifier/shaper circuit configured to pre-amplify and shape the second signal.

7. The data acquisition device of claim 1, wherein the first circuit includes an analog-to-digital converter that digitizes the first signal.

8. The data acquisition device of claim 1, wherein each sensor of the plurality of sensors is substantially a same size as each scintillation crystal in the array of scintillation crystals, so that each sensor covers a corresponding scintillation crystal.

9. A gamma ray detector, comprising:
   an array of scintillation crystals;
   an array of sensors; and
   a plurality of data acquisition devices, each data acquisition device including
      a summing circuit configured to sum a plurality of electrical signals from a corresponding plurality of sensors coupled to the array of scintillation crystals to generate a first signal, the plurality of sensors converting received light into the plurality of electrical signals, wherein the light is generated by a crystal of interaction in response to incident gamma rays generated by an annihilation event;
      a delay summing circuit configured to selectively delay and sum the plurality of electrical signals to generate a second signal;
      a first circuit configured to receive the first signal and to determine an energy and an event time of the first signal; and
      a second circuit configured to receive the first signal and the second signal and to determine, based on when the first and second signals respectively exceed a predetermined threshold, which sensor of the plurality of sensors corresponds to a location of the crystal of interaction.

10. The gamma ray detector of claim 9, wherein the delay summing circuit comprises:
    at least one summer and at least one delay element so that the second signal is a sum of each signal of the plurality of electrical signals delayed by a different amount of time.

11. The gamma ray detector of claim 9, wherein the plurality of sensors form a row, a column, or a block of sensors within a larger array of sensors.

12. The gamma ray detector of claim 9, wherein the second circuit comprises:
    a pulse ID threshold generator configured to generate the predetermined threshold;
    a first comparator configured to compare the first signal with the predetermined threshold, and to generate a start signal when the first signal exceeds the predetermined threshold;
    a second comparator configured to compare the second signal with the predetermined threshold, and to generate a stop signal when the second signal exceeds the predetermined threshold; and
    a counter configured to receive the start and stop signals, to start counting in response to receiving the start signal, and to stop counting in response to receiving the stop signal.

13. The gamma ray detector of claim 12, wherein the pulse ID threshold generator includes a digital-to-analog converter.

14. The gamma ray detector of claim 9, further comprising:
    a first pre-amplifier/shaper circuit configured to pre-amplify and shape the first signal; and
    a second pre-amplifier/shaper circuit configured to pre-amplify and shape the second signal.

15. The gamma ray detector of claim 9, wherein the first circuit includes an analog-to-digital converter that digitizes the first signal.

16. The gamma ray detector of claim 9, wherein each sensor of the plurality of sensors is substantially a same size as each scintillation crystal in the array of scintillation crystals, so that each sensor covers a corresponding scintillation crystal.

17. A gamma ray detection method, comprising:
    generating a first signal by summing a plurality of electrical signals from a corresponding plurality of sensors coupled to an array of scintillation crystals, the plurality of sensors converting received light into the plurality of electrical signals, wherein the light is generated by a crystal of interaction in response to incident gamma rays generated by an annihilation event;
    generating a second signal by selectively delaying and summing the plurality of electrical signals;
    determining an energy and an event time of the first signal; and
    determining, based on when the first and second signals respectively exceed a predetermined threshold, which sensor of the plurality of sensors corresponds to a location of the crystal of interaction.

18. The gamma ray detection method of claim 17, wherein the plurality of sensors form a row, a column, or a block of sensors within a larger array of sensors.

19. The gamma ray detection method of claim 17, further comprising:
    generating the predetermined threshold;
    comparing the first signal with the predetermined threshold;
    generating a start signal when the first signal exceeds the predetermined threshold;
    comparing the second signal with the predetermined threshold;
    generating a stop signal when the second signal exceeds the predetermined threshold;
    starting counting in response to the generation of the start signal; and
    stopping counting in response to the generation of the stop signal.

20. The gamma ray detection method of claim 17, further comprising:
    pre-amplifying and shaping the first signal and the second signal.

21. The gamma ray detection method of claim 17, further comprising:

digitizing the first signal using an analog-to-digital converter.

22. The gamma ray detection method of claim 17, wherein each sensor of the plurality of sensors is substantially a same size as each scintillation crystal in the array of scintillation crystals, so that each sensor covers a corresponding scintillation crystal.

* * * * *